Figure 1:
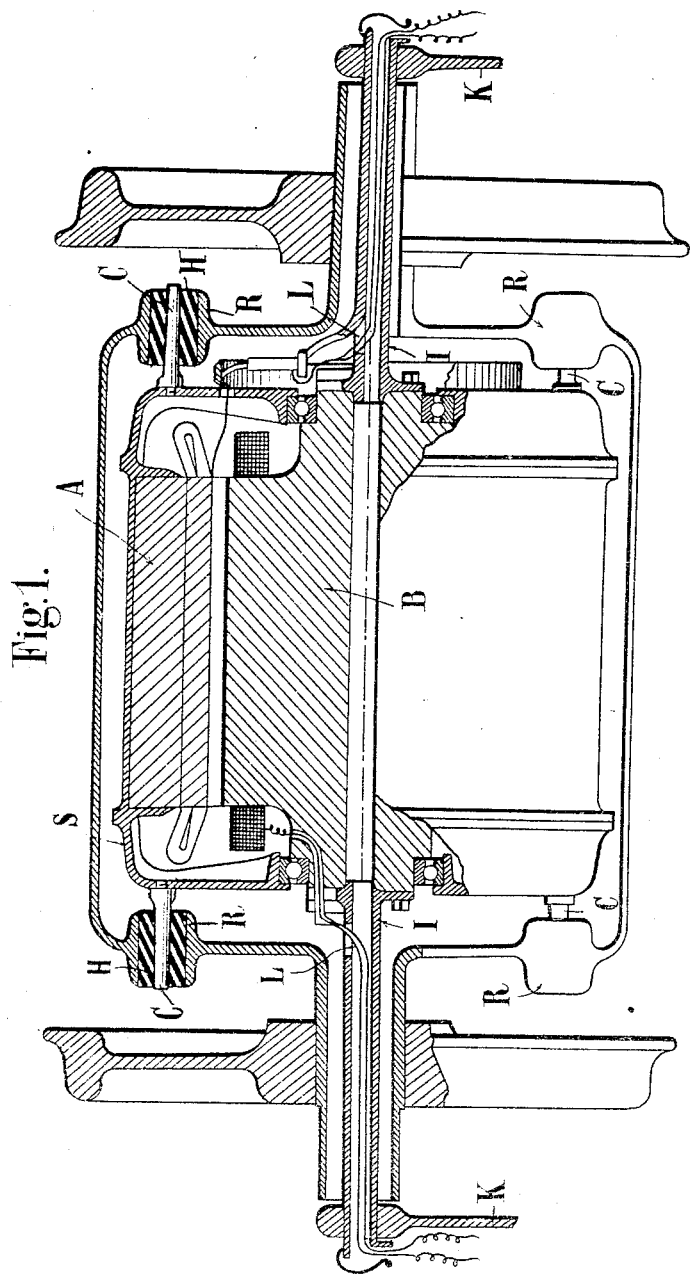

D. BALACHOWSKY & P. CAIRE.
DRIVING AXLE.
APPLICATION FILED JULY 12, 1909.

1,055,598. Patented Mar. 11, 1913.
3 SHEETS—SHEET 1.

WITNESSES:
INVENTORS
BY
ATTORNEYS.

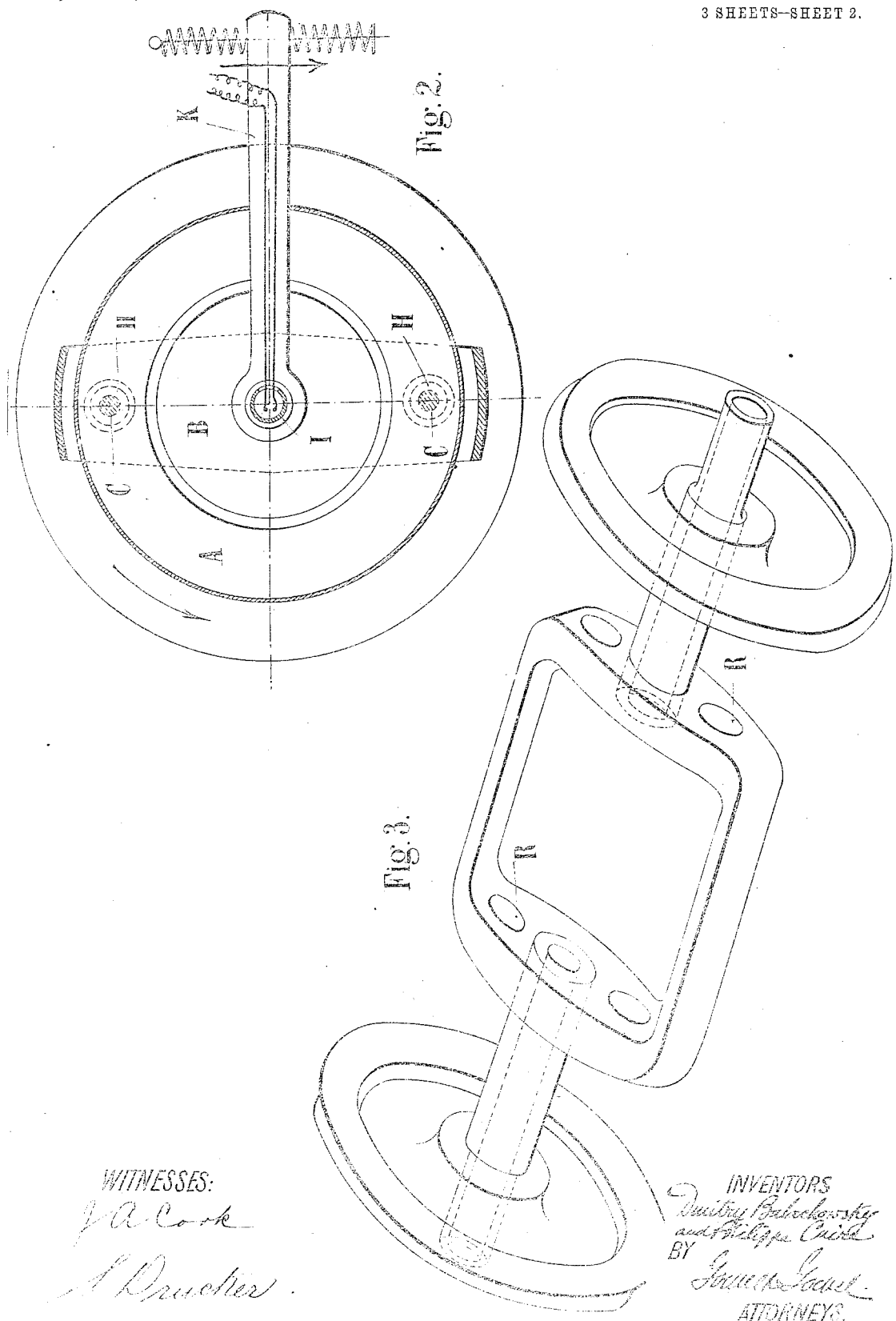

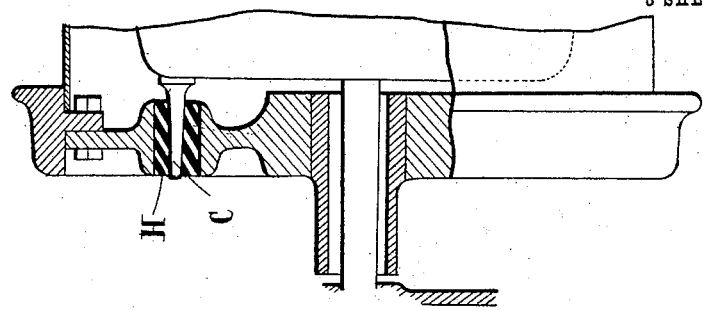
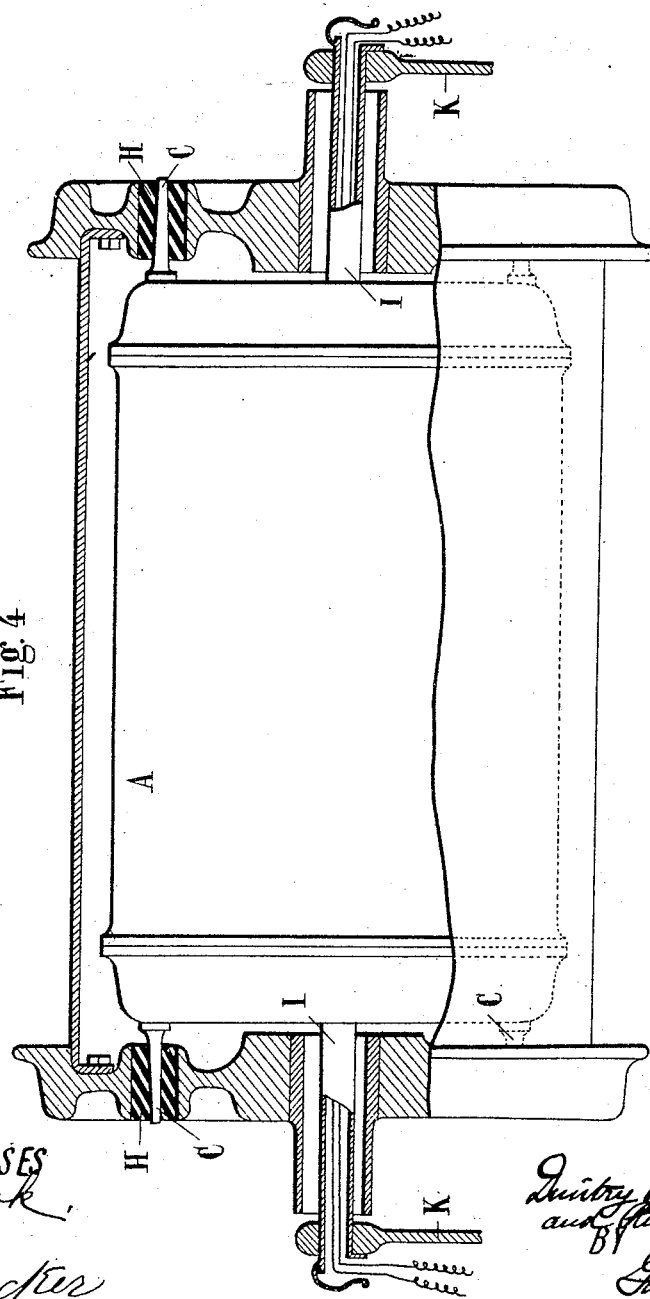

UNITED STATES PATENT OFFICE.

DMITRY BALACHOWSKY AND PHILIPPE CAIRE, OF NEUILLY-SUR-SEINE, FRANCE.

DRIVING-AXLE.

1,055,598.     Specification of Letters Patent.    Patented Mar. 11, 1913.

Application filed July 12, 1909. Serial No. 507,089.

*To all whom it may concern:*

Be it known that we, DMITRY BALACHOWSKY and PHILIPPE CAIRE, the former a subject of the Emperor of Russia, the latter a citizen of the Republic of France, both residing in Neuilly-sur-Seine, France, have invented certain new and useful Improvements in or Relating to Driving-Axles, which improvements are fully set forth in the following specification.

This invention relates to various mechanical devices applicable to driving axles generally, the wheels of which are driven direct by an electric motor with continuous current or alternating single-phase or polyphase current.

The accompanying drawings which are given by way of example show in Figure 1 a diagrammatic plan of a driving axle of this kind, in Fig. 2 a diagrammatic side elevation of the same axle, in Fig. 3 the particular shape that the axle may have with this method of erecting, Figs. 4 and 5 are modified constructions of the same system.

It is well known that in locomotives, motor cars or tramways, in the case when the axle and the wheels are driven direct by an electric motor, the movable part of the electric motor is either keyed direct to the axle, or a space is left between the axle itself and a hollow spindle of the electric motor, the whole being suspended by means of helical or leaf springs, so that the two shafts shall be capable of relative movement. To that end, a sufficient interval is left between the axle and the hollow spindle. In both cases, the armature being concentric with the straight axle, it is impossible to take off a damaged motor without first taking off one of the wheels which are generally put on by means of a hydraulic press.

The object of this invention is, therefore, to attain the following advantages: 1. Possibility of taking off quickly a gearless electric motor. 2. Protection against shocks and vibrations of all the insulating parts and of all parts of the motor. 3. Rational suspension of the complete electric motor, reacting in every direction and capable of absorbing and deadening shocks and vibrations. All these advantages are attained without affecting the mechanical strength of the whole.

In Fig. 1, the whole of the electric motor is shown in the center, the part B represents the fixed part and the part A the movable part. In this description these two expressions "fixed part" and "movable part" will be used for these improvements are applicable without distinction, to all kinds of electric motors with alternating current or with continuous current. On the other hand, it is possible to reverse even in any of these cases, the parts played as a movable part by the armature or the field magnet.

The framework S secured to the movable part A is provided with detachable tappets or fingers C engaging with rubber blocks H mounted in cylindrical portions R of the axle itself. This axle has a special shape as shown in Fig. 3. While being in a single piece, or at least consisting of a number of pieces forming one single part, the axle is provided in the center with a framework forming a space capable of receiving the electric motor after the driving tappets or fingers have been first taken off, the said fingers being put in place through the cylindrical openings R after the introduction of the motor.

Lateral extensions or end-shafts of the axle in question, forming the spindles for the wheels, are provided with a hole of sufficient size to admit a hollow spindle I secured to the fixed part B, the said spindle I being in one piece, or in several pieces secured together. The object of the said spindle is to render the part B fixed. The latter part is held by means of keyed reaction bars K arranged immediately at the point where the said hollow spindle I comes out, that is to say, beyond the extensions of the axle. If the hollow spindle I is in one piece, it must be withdrawn completely to enable the motor to be removed. In the construction shown in Figs. 1 and 4, it consists of two parts secured to the part B. It is sufficient then to unbolt them and to unscrew them for releasing the part B.

In the interior of the said hollow spindle is provided the passage for the cables terminating at the movable part, that is to say, going either to a fixed coil or to the brushes.

The opening L enables the cables to be passed to the outside. They can be placed in conduits along the reaction bar K. The reaction bar K rests at its outer end on springs, as shown in Fig. 2, which provide a resilient means connected by the reaction bar with the spindle. The springs which act on the reaction bar are supported on the stationary parts of the frame of the vehicle to which the motor is applied.

As shown in Figs. 4 and 5, instead of using a cranked axle, a tubular axle may be used. Said tubular axle comprises a continuous envelop or casing T which holds the wheels in spaced relation to each other and to which the moving part of the motor is connected by the fingers C and the blocks H or by any other suitable device.

We claim—

1. A driving mechanism comprising a rotative axle provided with wheels and having hollow end-shafts, said axle also comprising a framework forming a space adapted to receive a motor, a motor within said space comprising an outer rotative part connected to the said axle and a non-rotative part, and spindles connected to the ends of said non-rotative part and extending through said hollow shafts without any contact.

2. A driving mechanism comprising a rotative axle provided with wheels and having hollow end-shafts said axle also comprising a framework forming a space adapted to receive a motor, a motor within said space comprising an outer rotative part connected to the said axle and a non-rotative part, spindles connected to the ends of said non-rotative part and extending through said hollow shafts without any contact, the rotative and non-rotative parts being concentric, and resilient means connected with said spindles.

3. A driving mechanism comprising a rotative axle provided with a framework forming a space adapted to receive a motor therein, a motor within said space and consisting of a rotative part connected to said framework and a non-rotative part, a non-rotative spindle connected to the non-rotative part, said non-rotative spindle and part being concentric and within the rotative axle and part, and resilient means interposed between said rotative axle and said rotative part.

4. A driving mechanism comprising a rotative axle provided with hollow end-shafts and a central frame provided with end-openings and forming a space adapted to receive a motor, a motor within said space and consisting of an outer rotative part and an inner non-rotative part, fingers carried by the rotative part and projecting into said openings, resilient blocks in said openings and surrounding said fingers, and a non-rotative spindle passing through said hollow shafts and connected to said non-rotative part.

5. A driving mechanism comprising a rotative axle provided with hollow end-shafts and a central frame provided with end-openings and forming a space adapted to receive a motor, a motor within said space and consisting of an outer rotative part and an inner non-rotative part, fingers carried by the rotative part and projecting into said openings, resilient blocks in said openings and surrounding said fingers, and non-rotative spindles releasably secured to the ends of the non-rotative part and extending through said hollow shafts.

6. A driving mechanism comprising a rotative axle provided with hollow end-shafts and a central frame provided with end-openings and forming a space adapted to receive a motor, a motor within said space and consisting of an outer rotative part and an inner non-rotative part, fingers carried by the rotative part and projecting into said openings, resilient blocks in said openings and surrounding said fingers, non-rotative hollow spindles bolted to said non-rotative part and extending through said hollow shafts, conducting wires passing from said rotative and non-rotative parts out through the hollow axles, a reaction bar secured to said hollow axle, and supporting wheels on said hollow shafts.

7. A driving mechanism comprising a motor provided with a rotative part and a non-rotative part, the rotative and non-rotative parts being concentric, detachable fingers carried by the rotative part, a tubular rotative axle, resilient means interposed between the rotative axle and fingers, and a fixed spindle located in said rotative axle and extending through the end-portions of the same.

8. A driving mechanism comprising a rotative axle provided with a central frame having openings and adapted to receive a motor, a motor within said frame and comprising a rotative part and a fixed part, detachable fingers carried by said rotative part and projecting into said openings, resilient blocks in said openings and surrounding said fingers, and a fixed spindle located in said rotative axle and extending through the end-portions of the same.

9. A driving mechanism comprising a rotative axle provided with wheels, and with two hollow shafts connected by one frame-piece forming a space adapted to receive a motor, a motor within said space comprising an outer rotative part connected to the said axle and a non-rotative part, spindles connected to the ends of said non-rotative part and extending through the hollow shafts of said rotating axle without any contact.

10. A driving mechanism comprising a rotative axle provided with wheels and comprising two hollow shafts connected by several framepieces forming a space adapted to receive a motor, a motor within said space comprising an outer rotative part connected to the said axle and a non-rotative part, spindles connected to the ends of said non-rotative part and extending through the hollow shafts of said rotating axle without any contact.

In testimony whereof we have signed this specification in the presence of two subscribing witnesses.

DMITRY BALACHOWSKY.
PHILIPPE CAIRE.

Witnesses:
EMILE LEDRET,
DEAN B. MASON.